INVENTOR.
FRANK SZERDA his ATTORNEYS

Nov. 13, 1962    F. SZERDA    3,063,659
SAFETY AIRCRAFT

Filed Dec. 23, 1960    3 Sheets—Sheet 3

INVENTOR.
FRANK SZERDA

BY
his ATTORNEYS

United States Patent Office 3,063,659
Patented Nov. 13, 1962

3,063,659
SAFETY AIRCRAFT
Frank Szerda, 246 Atwood St., Pittsburgh 13, Pa.
Filed Dec. 23, 1960, Ser. No. 78,014
5 Claims. (Cl. 244—46)

This invention relates to safety aircraft and particularly to a winged craft of the heavier-than-air type which is designed to offer great resistance to falling.

One of the great dangers in heavier-than-air craft is that, as speeds increase, so do the stream lining and relative weight to buoyancy increase. This results in higher landing speeds, higher take-off speeds, less buoyancy in the air, less stability, less safety and much less opportunity to make safe emergency landings.

Early heavier-than-air craft were slow in speed and had a high degree of buoyancy. Their steering surfaces were effective at low speed and emergency landings in farm fields, on highways and open areas were the common thing. Today aircraft have lost this ability to make safe emergency landings.

I have invented an aircraft structure which overcomes this problem of inability to make safe emergency landings. I provide a heavier-than-air craft having preferably a fuselage and tail assembly of conventional form together with a power unit. Preferably I provide paired wing members on each side of the fuselage extending transversely from adjacent the top and bottom of the fuselage in planes intersecting at a point remote from the fuselage to form a V-shaped passage therebetween. A generally triangular wing member is hinged to the leading edge of each wing member and control means are provided for causing these triangular members to pivot so that their leading edge may be brought together to close the passage between the wings. Ailerons and other control surfaces are provided on the wing members in usual fashion.

In the foregoing general description I have set forth the problems solved by this invention together with certain objects, purposes and advantages sought to be achieved. Other objects, purposes and advantages of this invention will be apparent from a consideration of the following description and the accompanying drawings, in which.

Figure 1:
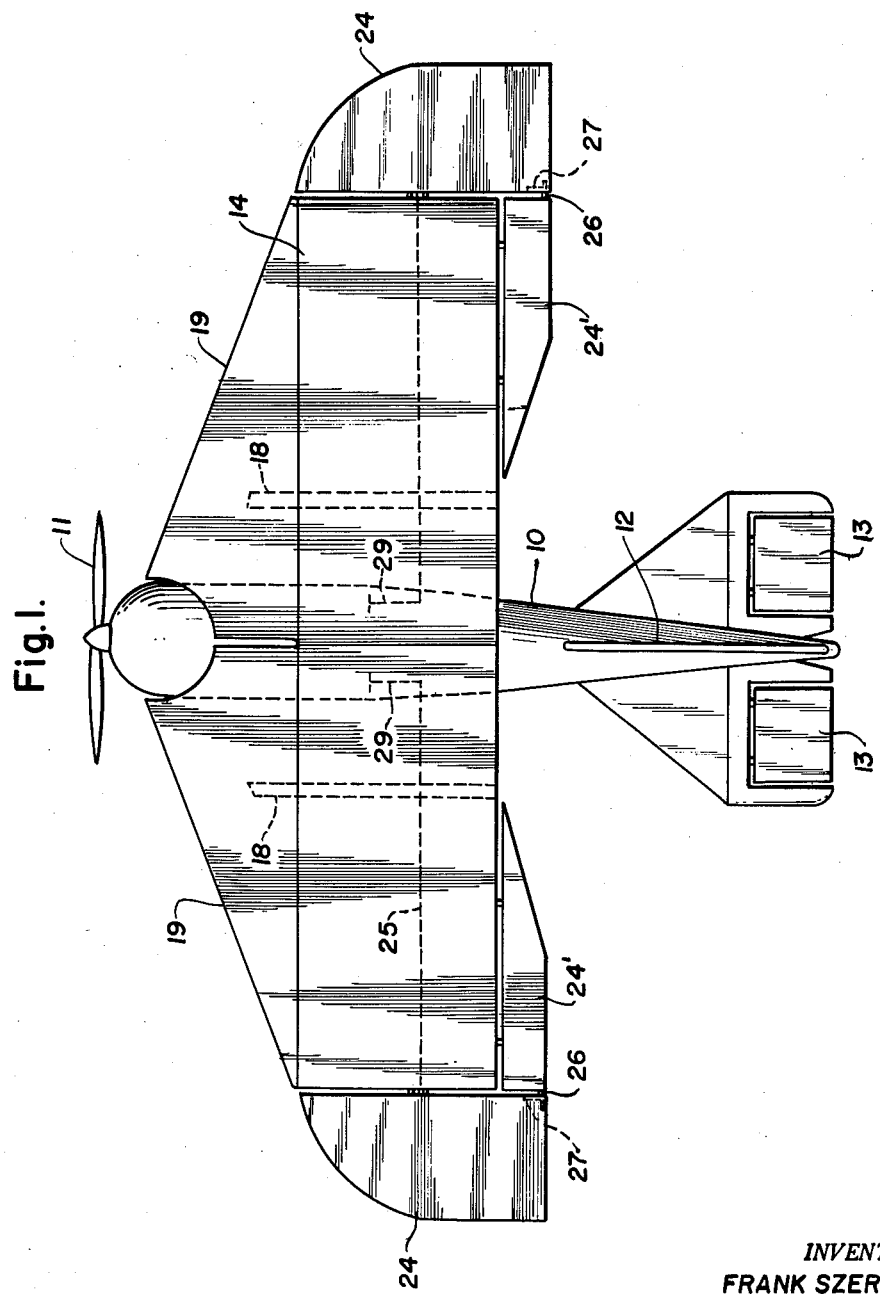
FIG. 1 is a top plan view of an aircraft according to my invention.

Referring to the drawings I have illustrated an aircraft fuselage 10 having a propeller 11 driven by a conventional power unit (not shown) and having at the rear a conventional tail assembly of rudder 12 and elevators 13. An upper main wing 14 and lower main wing 15 are fixed to the fuselage on each side at top and bottom respectively of the fuselage preferably by struts 16. These main wing members 14 and 15 converge to a common line 17 at their outer extremities remote from the fuselage. A wing stiffener or strut 18 is provided between wing members 14 and 15 intermediate their ends.

Figure 2:
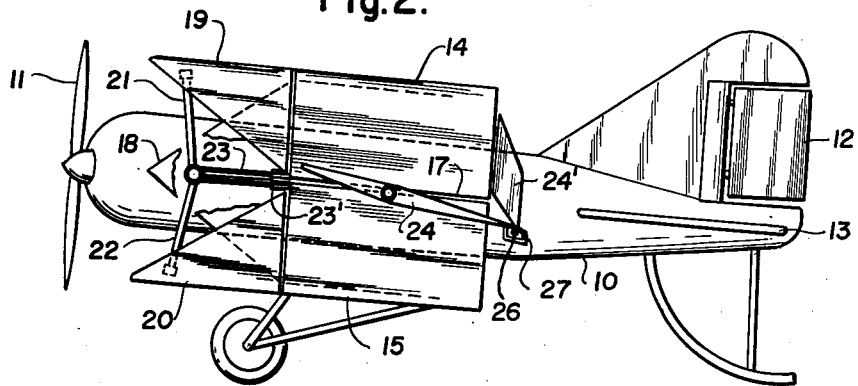
FIGURE 2 is a side elevation of the aircraft of FIGURE 1 with the movable wing members in open position.
Figure 3:
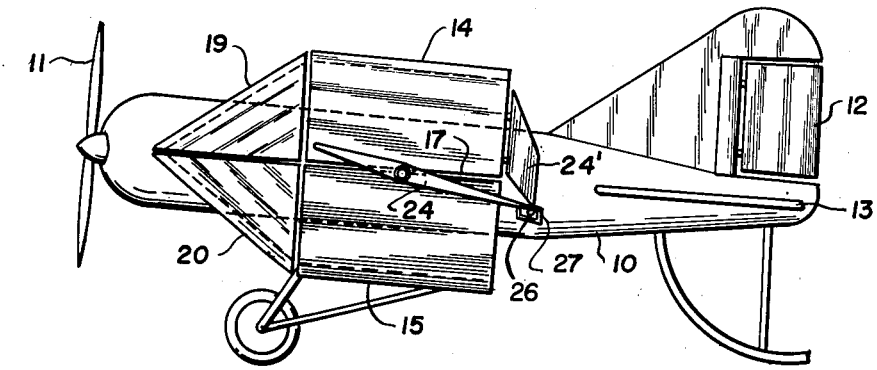
FIGURE 3 is a side elevation of the aircraft of FIGURE 1 with the movable wing members in closed position.
Figure 4:
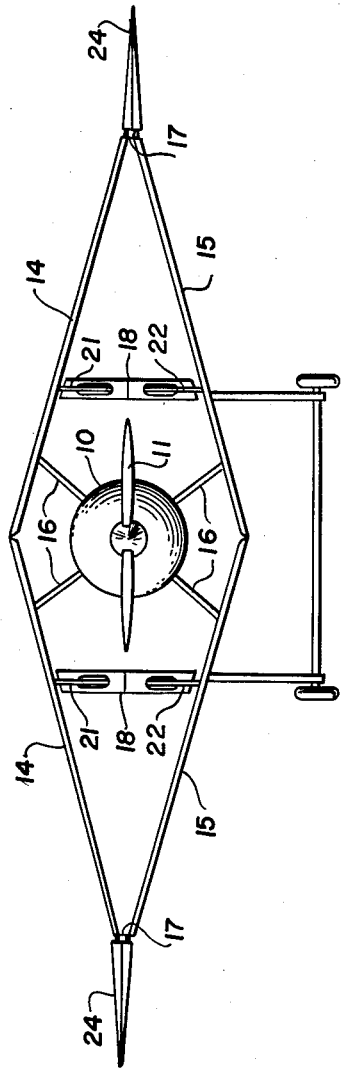
FIGURE 4 is a front elevation of the aircraft of FIGURE 2.
Figure 5:
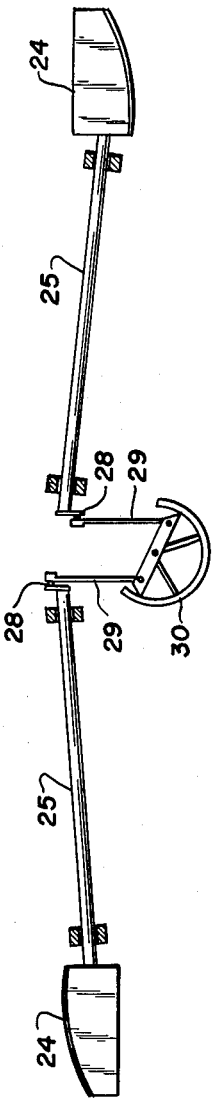
FIGURE 5 is a schematic view of the control assembly and balancing arm.

Upper and lower movable forward wing members 19 and 20 are hinged to the leading edges of wing members 14 and 15. Toggle arms 21 and 22 are fixed at one end to each of the movable wing members 19 and 20. The opposite ends of the toggle members are fixed to the end of a piston rod 23 movable in a cylinder 23' mounted in wing strut 18. Movement of piston rod 23 out of cylinder 23' extends the toggles and forces the forward movable wing members 19 and 20 to normal flight position (see FIGURES 2 and 4). Movement of piston rod 23 into cylinder 23' closes the movable wing members together at their leading edges (see FIGURE 3). A primary aileron 24 is fixed to control arm 25 extending from the intersecting ends of the wing members and is rotatable with respect to the plane of the wings. A secondary aileron 24' is hinged to the trailing edge of the upper main wing member 14 and is operated by means of an arm 26 slidable in an oblong bearing 27 in the primary aileron 24. The primary aileron control arms 25 may be rotated by means of cranks 28 on the inner ends thereof connected to drive arms 29 on control wheel 30.

When the aircraft of this invention is in normal flight, the forward movable wing members 19 and 20 lie in the plane of the main wing members 14 and 15. In the event of an emergency descent, however, the piston rod 23 is withdrawn into cylinder 23' and the leading edges of the movable wing members come together, preferably at an angle, about 45°, closing the passage between the main wings. This creates a large void open to the rear of the wing members. This void and the change in stream lining of the wing cause a braking effect by reason of two effects: (1) the suction effect of the void at the rear of the wing and (2) the frictional resistance of the air stream on the closed forward wing surfaces. In turn the buoyancy effect of the wing on the plane is increased and the plane may be maneuvered and landed at much lower ground speed.

While I have illustrated and described a present preferred embodiment of my invention, it will be understood that this invention may be otherwise embodied within the scope of the following claims.

I claim:

1. In a heavier-than-air plane having a fuselage, a propulsion unit, and a tail assembly the improvement, comprising, a pair of main wing members on each side of the fuselage intermediate its ends and extending transversely thereto, said pair of wing members intersecting at a point remote from the fuselage to form an open passage therebetween, a movable wing member hinged to the leading edge of each main wing member, said movable wing members being shaped so that they may be brought together at their unhinged side to close the opening between the main wing members, control means for moving the movable wing members from open to closed position and movable control surfaces on the main wing members for changing the air flow surface direction of the wing.

2. In a heavier-than-air plane having a fuselage, a propulsion unit and a tail assembly, the improvement comprising a pair of main wing members on each side of the fuselage intermediate its ends and extending transversely thereto, one of said main wing members beginning at a point adjacent the top of the fuselage and the other main wing member beginning at a point adjacent the bottom of the fuselage and intersecting at their opposite ends to form an open generally triangular passage therebetween, a movable wing member hinged to the leading edge of each main wing member, said movable wing members being shaped so that they may be brought together at their unhinged side to close the opening between the main wing members, control means for moving the movable wing members from open to closed position and movable control surfaces on the main wing members for changing the air flow surface direction of the wing.

3. A heavier-than-air plane as claimed in claim 2 wherein the movable wing members are of generally triangular form and meet when closed on a line in advance of the leading edges of the main wing members.

4. A heavier-than-air plane as claimed in claim 2 wherein the control means is a hydraulic cylinder between each pair of main wing members having a piston movable therein and link means in toggle arrangement on the piston connected to the movable wing members.

5. A heavier-than-air plane as claimed in claim 2 wherein the movable control surfaces include ailerons at the trailing edge of at least one main wing member of each pair and a wing tip movable about a line through its length midway between leading and trailing edges.

References Cited in the file of this patent

UNITED STATES PATENTS

| | | |
|---|---|---|
| 1,227,464 | McCabe | May 22, 1917 |
| 1,390,901 | Golein | Sept. 13, 1921 |
| 1,413,086 | White | Apr. 18, 1922 |
| 1,939,682 | Fleming | Dec. 19, 1933 |

FOREIGN PATENTS

| | | |
|---|---|---|
| 1,207,944 | France | Sept. 7, 1959 |